No. 793,792. PATENTED JULY 4, 1905.
J. C. JOHNSTON.
SEED PLANTER AND FERTILIZER DISTRIBUTER.
APPLICATION FILED AUG. 10, 1904.
2 SHEETS—SHEET 2.
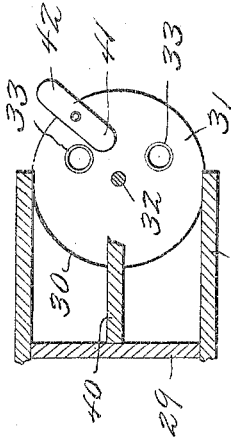
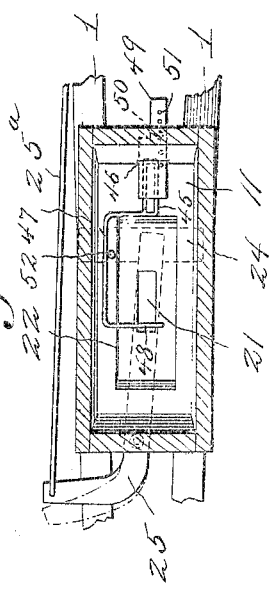
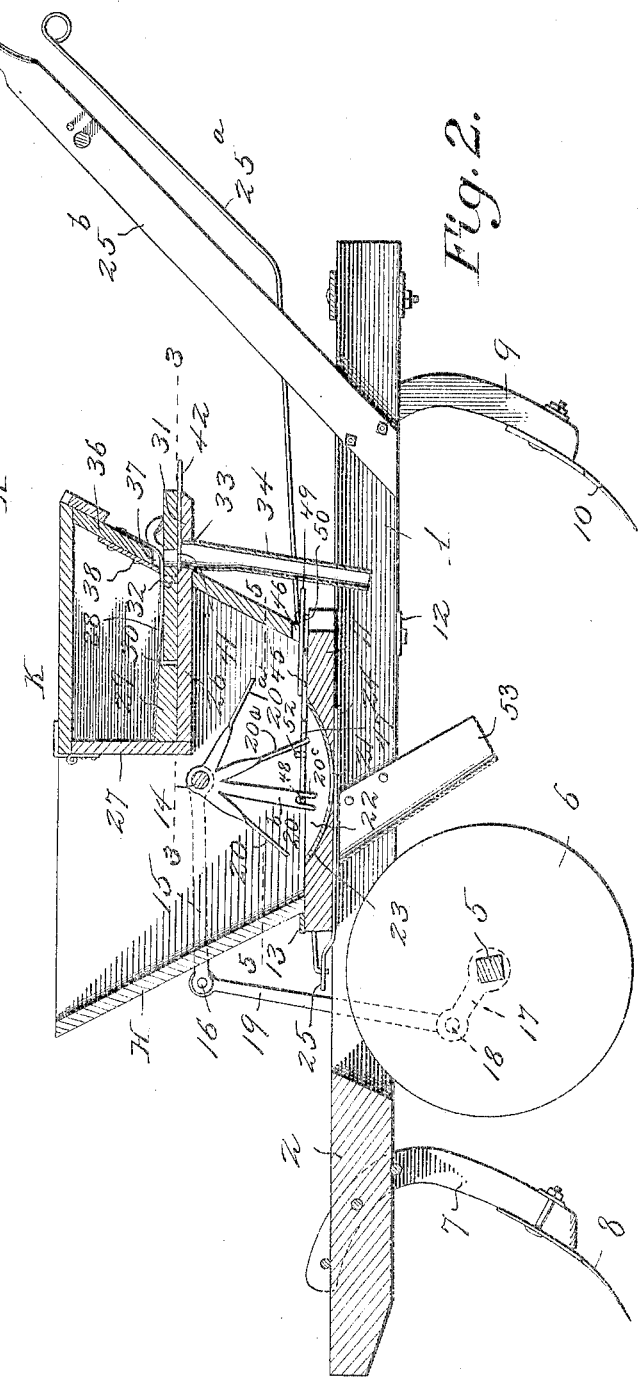
Witnesses
E. F. Stewart
Wm Ragger
John C. Johnston, Inventor.
by C. A. Snow & Co.
Attorneys No. 793,792. Patented July 4, 1905.

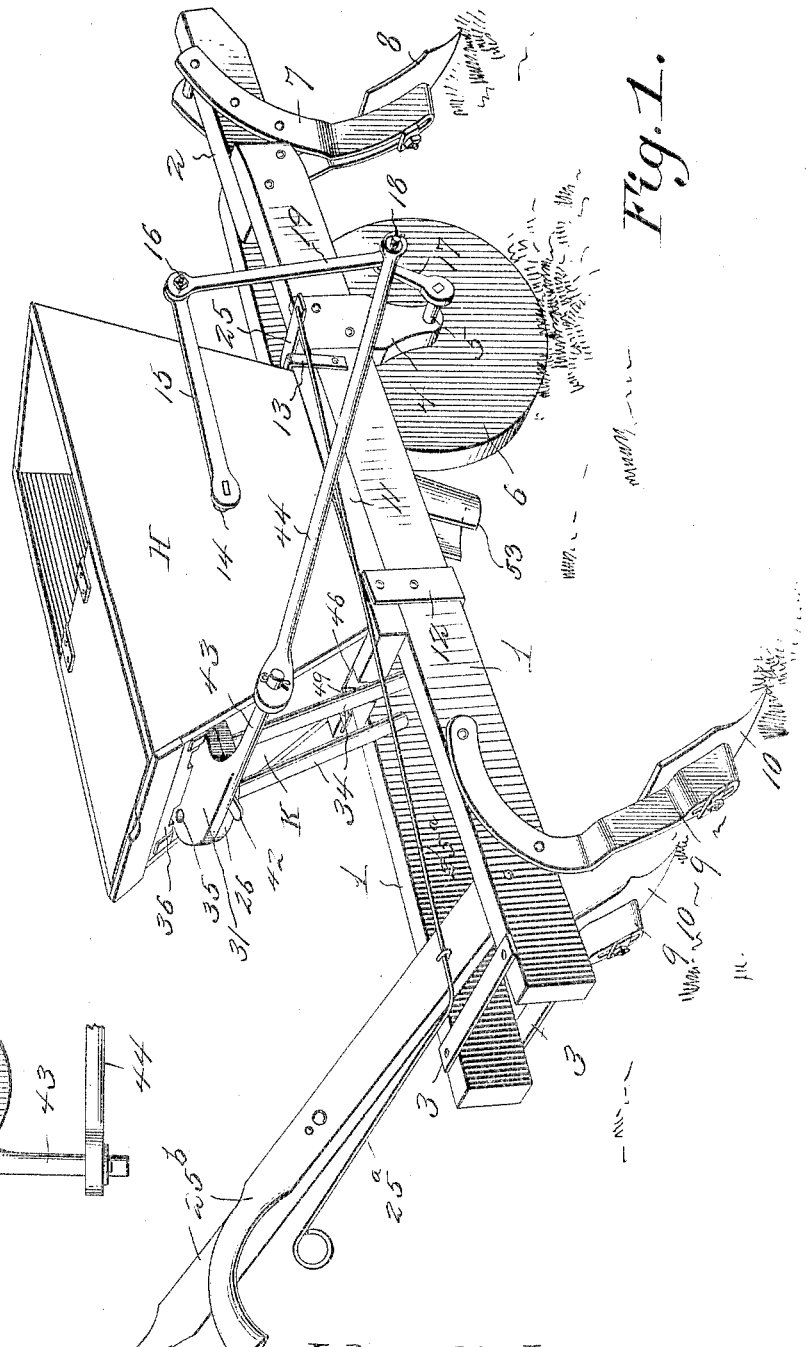

UNITED STATES PATENT OFFICE.

JOHN C. JOHNSTON, OF HARTFORD, GEORGIA.

SEED-PLANTER AND FERTILIZER-DISTRIBUTER.

SPECIFICATION forming part of Letters Patent No. 793,792, dated July 4, 1905.

Application filed August 10, 1904. Serial No. 220,220.

*To all whom it may concern:*

Be it known that I, JOHN C. JOHNSTON, a citizen of the United States, residing at Hartford, in the county of Cherokee and State of Georgia, have invented a new and useful Seed-Planter and Fertilizer-Distributer, of which the following is a specification.

This invention relates to seeders and planters, and especially to that class of devices which are adapted at a single operation to distribute fertilizing material and to plant or sow seed of various descriptions; and it has for its object to provide a device of this class which shall possess superior advantages in point of simplicity, durability, and general efficiency.

With these and other ends in view, which will readily appear as the nature of the invention is better understood, the same consists in the improved construction and novel arrangement and combination of parts, which will hereinafter be fully described, and particularly pointed out in the claims.

In the accompanying drawings has been illustrated a simple and preferred form of embodiment of the invention, it being understood, however, that no limitation is necessarily made to the precise details therein exhibited, but that any changes, alterations, and modifications to which recourse may be had without departing from the spirit of the invention or sacrificing any of the advantages of the same are included.

In said drawings, Figure 1 is a perspective view of a combined seed-planter and fertilizer-distributer constructed in accordance with the principles of the invention. Fig. 2 is a longitudinal sectional view of the same. Fig. 3 is a horizontal sectional detail view taken on the plane indicated by the line 3 3 in Fig. 2 directly below the oscillatory seed-disk of the seed-planting mechanism. Fig. 4 is a plan view of the oscillatory seed-disk, and Fig. 5 is a horizontal sectional detail view taken on the plane indicated by the line 5 5 in Fig. 2.

Corresponding parts in the several figures are indicated by similar characters of reference.

In carrying out this invention a frame is provided comprising two forwardly-converging beams 1 1, between the front ends of which is mounted the tongue 2, said beams being spaced apart at their rear ends by cross pieces or braces 3 3. Each of the beams 1 is provided near its front end with a depending bracket 4, the two brackets supporting bearing means for the axle 5 of the transporting and operating wheel 6. Upon the tongue 2 is mounted a standard 7, carrying a furrow-opener 8, and the side beams 1 1 are provided near their rear ends with standards 9, carrying covering members 10 of any suitable approved construction. The side beams 1 1 support a hopper H, the bottom of which is formed by a plate 11, connected with the side beams by means of clips 12 13 near the front and rear ends, respectively. The hopper H is provided with bearings for a transverse shaft 14, provided at one end thereof with a crank 15, having a wrist-pin 16. The shaft or axle 5 is likewise provided at one end with a crank 17, having a wrist-pin 18, which is connected by a pitman 19 with the wrist-pin 16 of the crank 15. The latter being much longer than the crank 17 of the axle, it follows that the rotation of the axle will impart an oscillatory movement to the transverse shaft 14, which latter is provided within the hopper with agitators 20 for the purpose of keeping the contents of said hopper, whether said contents be cotton-seed or fertilizing material, in a state of agitation, which will cause it to be forced regularly and evenly through a slot 21 in the bottom plate.

Under the preferred construction, which will be seen in Fig. 2 of the drawings, the bottom plate 11 is provided with a longitudinal cavity 22, which is segmental in shape and concentric with the shaft 14, said cavity being lined with a strip of sheet metal 23, in which the slot 21 is formed. By this construction the durability of the device is greatly increased and the slot, which is sufficiently wide to admit of the passage of the largest quantity of seed or fertilizing material that it may at any time be desired to deposit, is capable of regulation by means of a slide 24, pivotally mounted under the bottom plate 11 and having a laterally-extending arm 25, whereby it may be swung upon its pivot so as to obstruct a greater or lesser portion of the slot or feed-opening, thus permitting the escape of only such quantity of seed or fertilizing material as it may be desired to deposit or completely obstructing the opening when desired.

The rear portion of the hopper H contains an auxiliary hopper K, which includes a bottom plate 26 and a front member 27, which latter is in the nature of a transverse partition within the upper part of the main hopper. The rear side of the latter is cut away at its upper portion, so as to permit the rearward extension of the bottom plate 26, as shown. Within the auxiliary hopper and spaced above the bottom plate 26 of the latter is a bottom 28, which is mainly supported by means of a block 29, interposed between said bottom and the bottom plate 26, said spacing-block having a concave recess 30.

31 designates an oscillatory seed-disk which is supported upon the bottom plate 26, with which it is connected by means of a pivotal pin 32. The inner edge of the seed-disk, which latter is of an approximately circular shape, is accommodated and guided in the recess 30 of the block 29. The rearward-extending end of the bottom plate 26 is provided with openings 33, with which downwardly-extending seed-tubes 34 are connected. The seed-disk 31 is provided with seed-cells 35, which by the oscillation of the disk are alternately brought into registry with the perforations 34 in the seed-tubes, a portion of the bottom 28 being cut away in order to enable the seed to pass to the seed cups or cells to be conveyed by the latter to the seed-tubes and thence to the ground. The rear wall 36 of the auxiliary hopper K is provided with recesses 37, located directly above the path of the seed-cells and protected by flexible wipers 38, which serve to remove surplus seeds from the seed-cells when the device is in operation. The auxiliary hopper K is provided with a longitudinal partition 40, so that, if desired, two different kinds of seeds, such as corn and peas, may be planted at the same time, charges of the different kinds of seed being alternately delivered, as will be readily understood. Pivotally mounted upon the bottom plate 31 is a valve 41, having a rearwardly-extending handle 42, whereby it may be readily manipulated to close one of the seed-openings 33, so as to temporarily suspend when desired the dropping of seed from either of the compartments of the auxiliary hopper.

The oscillatory seed-slide is provided with a laterally-extending arm 43, which extends beyond the side of the hopper-casing and which is connected by a pitman 44 with the wrist-pin 18 upon the crank 17 of the axle, said wrist-pin being of sufficient dimensions to enable it to be connected simultaneously with the pitmen 44 and 19, as will be seen in the drawings.

For the purpose of manipulating the cut-off or slide 24 the laterally-extending arm 25 of the latter is connected with an operating-rod 25$^a$, which is suitably guided in the direction of the handles 25$^b$ of the machine, where it may be readily reached by the operator, who may thus conveniently regulate the escape of material from the main hopper.

When the auxiliary hoppers of the device are to be used for the purpose of planting either corn or other seeds, it will not always be desirable to discharge fertilizing material by the means which have been hereinbefore set forth, for the reason that by such means the fertilizing material is delivered in a continuous stream, of which only a comparatively small portion would be effective to promote the growth of the corn or other seeds deposited in hills a suitable distance apart. For the purpose, then, of dropping fertilizing material intermittently at each operation of the seed-dropping mechanism I provide special mechanism including a frame or carrier 45, extending through a slot 46 in the rear wall of the hopper and having a forwardly-extending arm 47, at the forward extremity of which is formed a laterally-extending bracket 48. The frame 45 is partially covered by a cut-off slide 49, extending through the rear wall of the hopper and adjustable by means of a pin 50, extending through one of a plurality of perforations 51 in said cut-off slide. The carrier-frame 45 receives a reciprocatory motion from the agitators or fingers extending from the rock-shaft 14, which is journaled in the hopper H. One of said fingers (specially designated 20$^a$) is longer than the remaining fingers and may engage the frame 45, while another of the fingers or agitators (specially designated 20$^b$) is bifurcated at its lower end, as shown at 20$^c$, and straddles the bracket 48. Hence when the rock-shaft 14 is in operation a reciprocatory movement will be imparted to the frame 45, which when it enters the hopper will be filled with a quantity of fertilizing material regulated by the position of the slide 49. When the said frame 45 is moved in a rearward direction, the fertilizing material carried thereby will be suffered to drop upon the ground alongside of the seeds that are being deposited by the seeding mechanism, which has been hereinbefore fully described.

For the purpose of guiding the fertilizer-distributing device, which has just been described, a pin 52 is provided, said pin projecting upwardly from the bottom of the hopper. The auxiliary fertilizer-distributing device may be detached from the hopper when the seed-planting mechanism is in operation.

A spout or tube 53 is disposed between the frame-beams 1 1, directly under the bottom-plate of the hopper, for the purpose of guiding the material escaping through the slot in the bottom of said hopper-plate into the furrow, which is opened in advance by the furrow-opener hereinbefore described.

The operation and advantages of this invention will be readily understood from the foregoing description, taken in connection with the drawings hereto annexed. As the machine progresses over the field a furrow is opened by the furrow-opener, and into this furrow fertilizing material is first discharged from the main hopper. Seeds of any description may then be deposited in the furrow from one or both of the compartments of the auxiliary hopper, the seeds being covered by the coverers attached to the standards connected with the rear ends of the frame-beams. If desired, the machine may be used as a cotton-planter, and the auxiliary hopper may then for the time being be thrown out of use.

The simplicity of the machine and its adaptability to a variety of uses render it especially useful and serviceable to farmers who are not able to afford a large variety of seed-planters and similar implements, while at the same time the work done by this machine leaves nothing to be desired.

A desirable feature of this invention is that the work performed thereby is always in full view of the operator, who may thus readily detect and remedy any failure to plant with the requisite promptness and regularity.

Having thus described the invention, what is claimed is—

1. In a machine of the class described, a hopper having a slot in its rear wall, a carrier-frame extending through said slot, a cut-off plate mounted adjustably above said carrier-frame, and means for operating the latter.

2. In a machine of the class described, a hopper having a slot in its rear wall, a carrier-frame supported upon the bottom of the hopper and extending through said slot, an arm extending forwardly from said frame and having a laterally-extending bracket, a rock-shaft mounted in the hopper, and agitating-fingers extending from said rock-shaft and adapted to engage, and to impart reciprocatory movement to the carrier-frame.

3. In a machine of the class described, a hopper having a slot in the rear wall thereof, a carrier-frame extending through said slot, an arm extending forwardly from said carrier-frame and having a laterally-extending bracket, a rock-shaft journaled in the hopper, an agitating-finger extending from said rock-shaft and engaging the carrier-frame, and a bifurcated agitator-finger extending from the rock-shaft and engaging the transverse bracket of the arm extending from the carrier.

4. In a machine of the class described, a hopper having a slot in the rear wall thereof, a carrier-frame supported upon the bottom of the hopper and adapted to extend through said slot, a rock-shaft journaled in the hopper, an agitating-finger extending from said rock-shaft and engaging the carrier-frame to operate the latter, auxiliary seed-dropping mechanism supported within the main hopper, and means for simultaneously operating the rock-shaft and the auxiliary seed-dropping mechanism.

5. In a machine of the class described a hopper having a slot in the rear wall thereof, a carrier-frame supported upon the bottom of the hopper and adapted to extend through said slot, a rock-shaft journaled in the hopper, an agitating-finger extending from said rock-shaft and engaging the carrier-frame to operate the latter, an auxiliary hopper within the main hopper, seed-dropping mechanism within said auxiliary hopper, a seed-spout depending from the auxiliary hopper and terminating in proximity to the slot in the rear side of the main hopper, and means for simultaneously operating the rock-shaft in the main hopper and the auxiliary seed-dropping mechanism.

In testimony that I claim the foregoing as my own I have hereto affixed my signature in the presence of two witnesses.

JOHN C. JOHNSTON.

Witnesses:
GEO. I. TEASLEY,
W. P. MARTIN.